No. 820,473. PATENTED MAY 15, 1906.
R. BUCHANAN.
ICE CREAM DIPPER.
APPLICATION FILED JUNE 15, 1905.
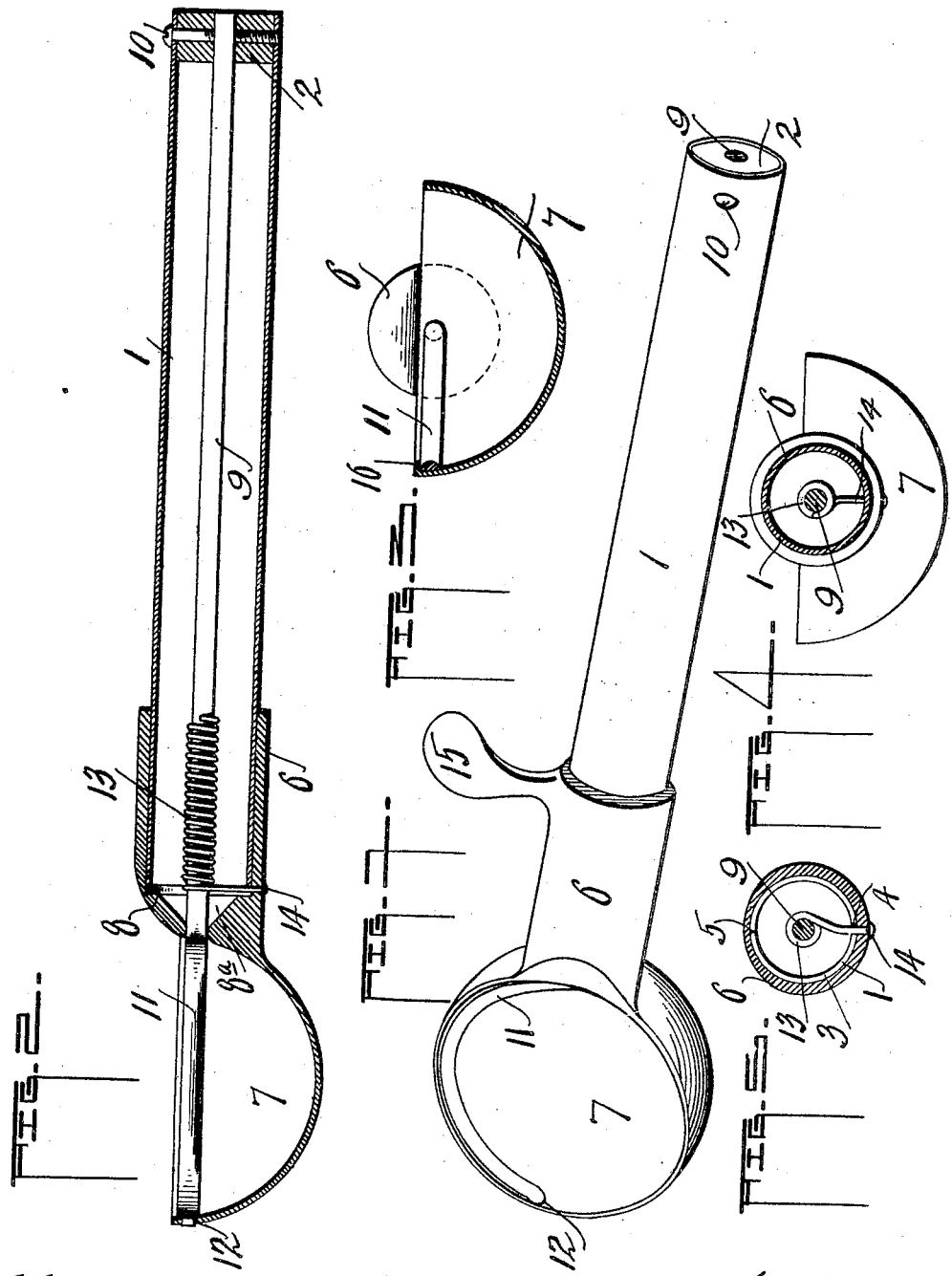

UNITED STATES PATENT OFFICE.

REA BUCHANAN, OF PEORIA, ILLINOIS.

ICE-CREAM DIPPER.

No. 820,473.      Specification of Letters Patent.      Patented May 15, 1906.

Application filed June 15, 1905. Serial No. 265,406.

*To all whom it may concern:*

Be it known that I, REA BUCHANAN, a citizen of the United States, residing at Peoria, in the county of Peoria and State of Illinois, have invented certain new and useful Improvements in Ice-Cream Dippers; and I do hereby declare that the following is a full, clear, and exact description of the invention, which will enable others skilled in the art to which it appertains to make and use the same.

This invention has reference to improvements in ice-cream dippers or dishers of that class designed especially for serving ice-cream at soda-fountains and for analogous purposes.

The object which I have in view is to provide a dipper wherein the bowl is revoluble or movable about the scraper, cutter, or cleaner.

A further object of the invention is to provide a dipper composed of a tubular handle portion, a sleeve revoluble on one end of such handle portion having a bowl semispherical in shape, a rod carried through the handle portion and out through the forward end of the sleeve and bowed to conform to the bowl aforesaid, with the forward end of the bowed portion of the rod journaled in the bowl, means on the sleeve whereby the same may be rotated on the handle portion, which movement causes the bowl thereof to revolve about the bowed end of the rod, a spring for returning the sleeve and bowl to their normal position, and means on the handle adapted to engage a part of the spring for limiting the movement of the sleeve in either direction.

With the above and other objects in view the invention finally consists in the novel construction, combination, and arrangement of parts, to be hereinafter more specifically described, and particularly pointed out in the claims.

In describing the invention in detail reference is had to the accompanying drawings, forming a part of this specification, and wherein like numerals of reference indicate similar parts throughout the several views, in which—

Figure 1 is a perspective view of my device. Fig. 2 is a view of my device in central vertical section. Fig. 3 is a cross-section through the bowl, looking toward the handle, the upper edge of one side of the bowl being modified and provided with a lip. Fig. 4 is a cross-section through the handle looking toward the bowl; and Fig. 5 is a cross-section through the sleeve at a point in front of the forward end of the handle and looking toward the same to illustrate the construction of the end of the handle and the mode of affixing the spring in the sleeve.

In the drawings, 1 denotes a tubular stem, which is of suitable length, serving as a handle for my improved dipper. Its forward end is open, while the rear end is closed by means of a plug 2, as shown. The open end of the handle has a semicircular cut-out portion 3, which provides the shoulders or projections 4 and 5 for a purpose to be described.

Revolubly carried on the forward end of the handle 1 is a short sleeve 6, which has attached thereto or formed integral therewith a semispherical bowl 7, serving as a mold or dipper for the said device. The sleeve is provided with an interiorly-arranged shoulder 8, adapted to lie adjacent to the end of the handle portion, and from the shoulder portion forward and communicating with the bowl thereof the same is provided with a tapered opening $8^a$ to adapt a rod or spindle, to be described, to be easily inserted or removed from the handle.

The rod or spindle just referred to is indicated as 9, the main body portion of which is carried in the tubular handle portion 1 with its rear end carried in the plug 2 and locked against rotation or longitudinal movement, preferably by means of the screw 10. At the forward end of the rod or spindle at a point where the same passes through the opening $8^a$ into the bowl 7 the said rod is bowed, as at 11, to conform to the wall of the said bowl and lies in juxtaposition to the same, forming a scraper, cutter, or cleaner for the said bowl. The scraper, as will be inferred, is substantially semicircular in form and has its forward end, which is in line with the longitudinal axis of the handle and rod, journaled in an opening 12 in the wall of the bowl.

Encircling the rod 9 within the handle portion, and preferably at the forward end thereof, is shown a coil-spring 13, its rear end fixedly attached to the rod and its forward end passing down through the cut-out portion 3 of the handle between the end of the handle and the shoulder 8 of the sleeve and secured in the said sleeve at a point 14, as shown.

The sleeve is shown provided with a thumb-piece 15, the same projecting laterally from the said sleeve and preferably at the rear end thereof.

In operation the operator after filling the bowl causes the thumb to engage the lower side of the thumb-piece and moving the thumb toward the palm of the hand causes the sleeve and bowl to rotate in the direction of movement of the thumb-piece. This movement of the sleeve rotates the bowl over the scraper, which, as noted, is held or fixed against rotation. Upon the opposite edge of the bowl, coinciding with the scraper, the thumb-piece is released, when the sleeve and bowl will automatically return to their normal positions through the acton of the spring. The shoulders or projections 4 and 5 of the end of the handle limit the movement of the sleeve in both directions. In their normal positions the shoulders 4 and 5 will be positioned as seen in Fig. 5, which retains the open face of the bowl facing upward, and in the rotation of the sleeve when the end of the spring which is carried through the sleeve engages the projection or shoulder 5 of the handle 1 the bowl has made one-half of a revolution and reached the limit of its movement, discharging the contents therein. Then it is that the spring will cause the return of the sleeve, which is limited in its return movement by the spring engaging the shoulder 4, all of which it is believed will be understood. As a modification to this mode of limiting the movement of the bowl I have shown a lip 16 on the upper edge of one side of the bowl with which the scraper will engage when the end of the spring instead of passing through the sleeve, which necessitates the cutting out of a portion of the end of the handle, is secured in the body of the sleeve in front of the end of said handle.

The device as herein provided has many advantages. As shown, it is of very simple construction and made of very few parts, presenting a device with a smooth exterior, preventing the collecting of any filth and fouling the operating mechanism with the cream.

Rotating the bowl instead of the scraper, the operator can the more easily discharge the cream from the bowl, and in so doing obviates the twisting of the wrist, which would be and is now the case in devices where the scraper is rotated to cut the cream from the bowl. The continued turning of the wrist or forearm grows very tiresome when dippers are constantly in use, and it is to avoid this heretofore tiresome operation that I have devised a bowl which will rotate about the scraper, and I regard this as of the utmost importance.

Having thus fully described my invention, what I claim, and desire to secure by Letters Patent of the United States, is—

1. In a device of the character described, the combination of a handle, a rod fixedly carried in the handle and having a bowed scraping portion projecting without the same, and a bowl carried by the handle and adapted to rotate about the axis thereof and also the scraper aforesaid.

2. In a device of the character described, the combination of a handle, a rod fixedly carried in the handle and having a bowed scraping portion projecting without the same, a semispherical bowl carried by the handle adapted to rotate about the axis thereof and also the scraper aforesaid, and means for rotating the bowl, which said means is movable in the direction of movement of the said bowl.

3. In a device of the character described, the combination of a handle, a sleeve rotatably carried on one end of the said handle and provided with a semispherical bowl, scraping means carried within the bowl aforesaid, means for rotating the sleeve, and means for limiting such rotation.

4. In a device of the character described, the combination of a handle, a rod secured in the handle and having a scraping portion, a sleeve carried on one end of the handle, a substantially semispherical bowl connected with the sleeve, and means for rotating the sleeve on the handle and with it the bowl which rotates about the scraping portion of the rod aforesaid.

5. In a device of the character described, the combination of a handle, a rod secured in the handle and having a scraping portion, a sleeve carried on one end of the handle, a substantially semispherical bowl connected with the sleeve, means for rotating the sleeve on the handle, and with it the bowl which rotates about the scraping portion of the rod aforesaid, and means for automatically returning the sleeve and bowl to their normal positions on the handle.

6. In a device of the character described, the combination of a tubular handle, a rod fixedly carried in said handle, a semicircular scraper integral with said rod, a sleeve revolubly carried on one end of the handle, a bowl connected with the said sleeve, and a thumb-piece projecting laterally from the said sleeve to adapt the rotation of the sleeve and the bowl, the latter movable about the scraper aforesaid.

7. In a device of the character described, the combination of a tubular handle, a sleeve revolubly carried on the handle, a bowl attached to the sleeve, scraping means secured to the handle and protruding through the sleeve into the bowl, and means for rotating the sleeve and thereby the bowl about the scraper aforesaid.

8. In a device of the character described, the combination of a handle, a sleeve revoluble on one end of the handle, a bowl attached to the sleeve, a scraper fixedly secured against movement and carried in the bowl, means for rotating the sleeve and bowl, means for automatically returning the sleeve and bowl to their normal positions, and means for limiting the movement of the said sleeve and bowl.

9. In a device of the character described, the combination of a handle, a sleeve revoluble on one end of the handle, a bowl integral with the sleeve, a scraper held against movement and carried in the bowl, a spring for returning the sleeve and bowl to their normal positions, and means for limiting the movement of the bowl.

10. In a device of the character described, the combination of a handle, a rod secured against rotation in the handle and having a bowed scraping portion, and a sleeve revoluble on the handle provided with a bowl revoluble about the scraper aforesaid.

11. In a device of the character described, the combination of a tubular handle having a front open end the wall surrounding which is recessed, a sleeve revolubly carried on said handle and having a substantially semispherical bowl, a rod fixedly carried in said handle, the same carried into the bowl aforesaid and forming a scraper therein, a coil-spring encircling the said rod in the handle, one end secured to the rod and its opposite end passing through the recess of the handle and secured in said sleeve, means for rotating the sleeve on the handle, and means for limiting the movement of the said sleeve.

In testimony whereof I affix my signature in presence of two witnesses.

REA BUCHANAN.

Witnesses:
CHAS. W. LA PORTE,
H. V. GIBSON.